INVENTORS.
Fredrick J. Soderquist
Howard Kehde
Lyle E. Martz
BY Stephen Hoynak
ATTORNEY

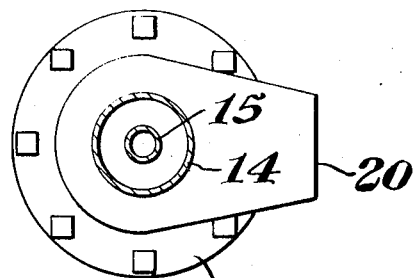
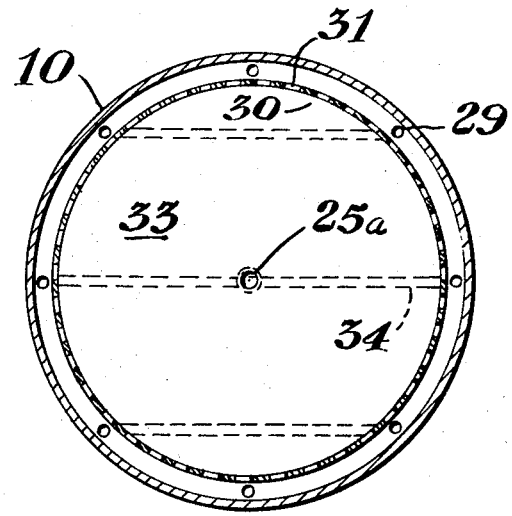
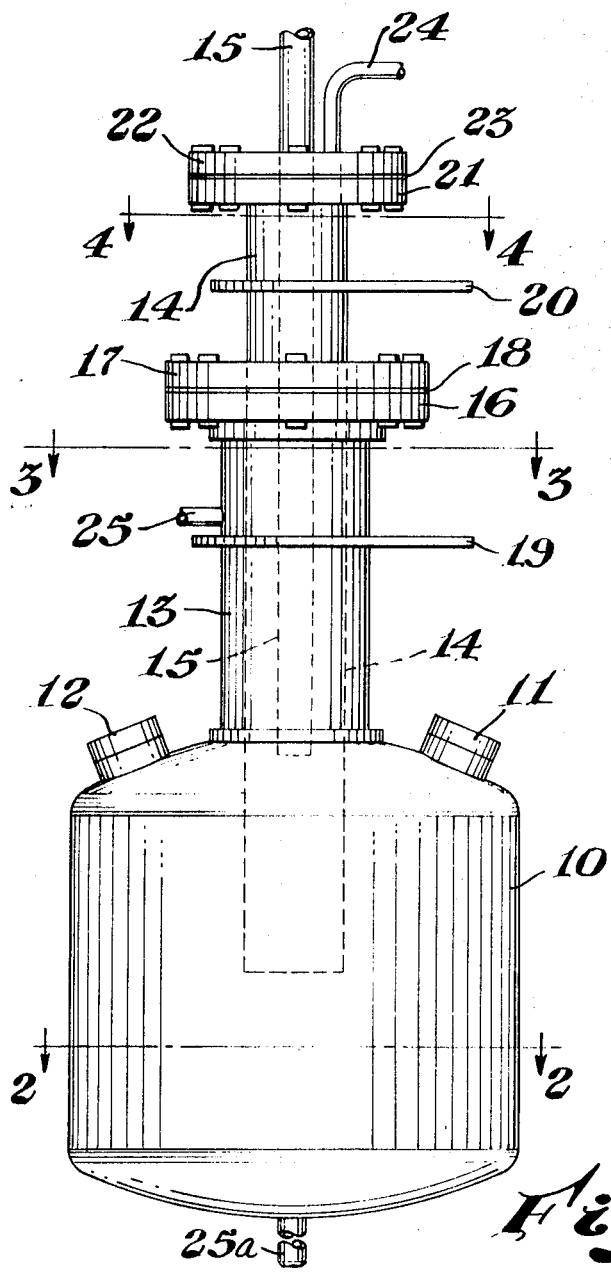
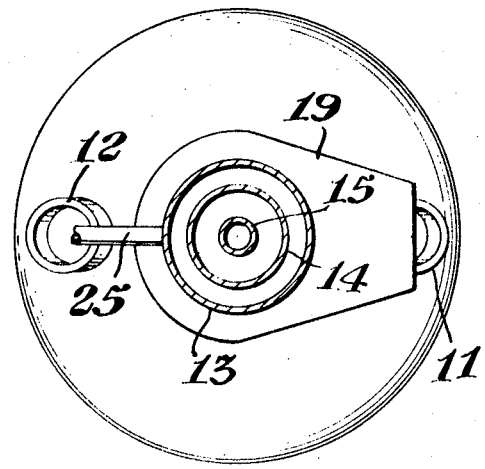

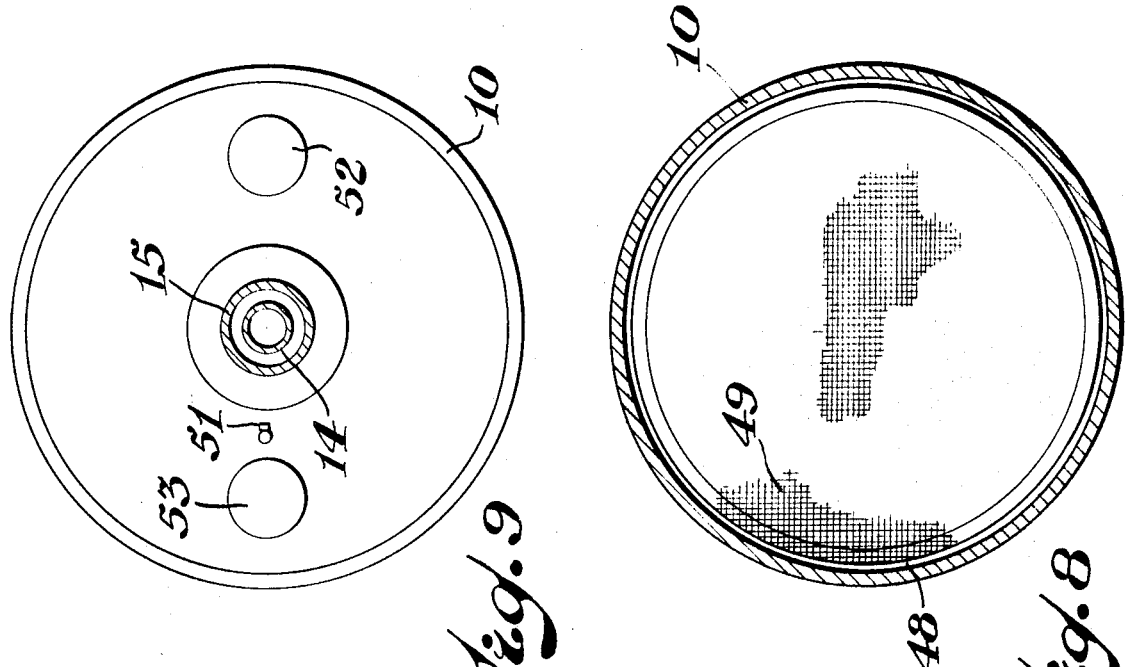
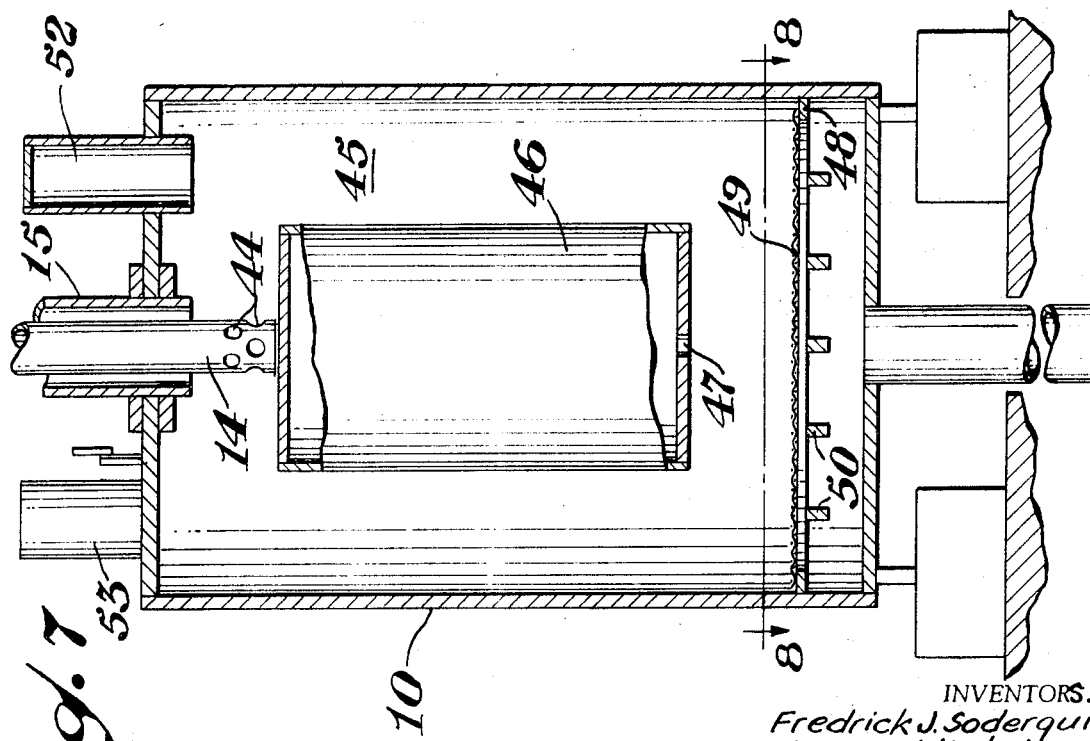

United States Patent Office 3,652,699
Patented Mar. 28, 1972

3,652,699
ELECTRICAL RESISTANCE HEATED REACTORS
AND DEHYDROGENATION OF ALKYL BENZENES
Frederick J. Soderquist, Essexville, and Howard Kehde
and Lyle E. Martz, Midland, Mich., assignors to The
Dow Chemical Company, Midland, Mich.
Filed Dec. 18, 1969, Ser. No. 886,116
Int. Cl. C07c 15/10, 5/18
U.S. Cl. 260—669     16 Claims

ABSTRACT OF THE DISCLOSURE

Reactors, capable of maintaining a desired temperature in a catalyst bed by resistance to passage of electrical energy through such bed have one electrode in contact with the catalyst and the other in contact with a reactor wall, and a method of dehydrogenating alkyl benzenes in said reactor.

BACKGROUND OF INVENTION

Methods for dehydrogenerating hydrocarbons to prepare vinyl monomers by passage of a mixture of a hydrocarbon, especially a $C_2$–$C_3$ alkyl benzene hydrocarbon, or ring alkylated derivatives thereof, and steam or other inert diluent such as nitrogen, methane and rare gases over an electrically heated regenerative catalyst at 500–750° C. are known. Reactors with parallel flow of process materials and electric current, both in a radial manner or with linear flow of process materials and radial electric current flow are useful for practicing the above process.

SUMMARY OF INVENTION

This invention relates to novel reactors which are particularly useful for controlling temperature in a catalyst bed in an endothermic reaction, such as hydrocarbon dehydrogenation, wherein one electrode is placed in abutting relation to the catalyst bed and the other electrode is a wall of the reactor, such that the electrical circuit is made by passage of current from one electrode through the catalyst bed to the second electrode. By control of the amount of electrical power fed to the system, conditioned on the resistivity of the catalyst, the temperature of the catalyst bed during the dehydrogeneration can be maintained in a desired range.

DETAILED DESCRIPTION

In the drawing FIG. 1 is an elevation of one form of reactor of this invention.

FIG. 2 is a cross-sectional view along lines 2—2, of FIG. 1.

FIG. 3 is a cross-sectional view along lines 3—3 of FIG. 1.

FIG. 4 is a cross-section along lines 4—4 of FIG. 1.

FIG. 7 is a vertical section, with parts broken away, of another modification of the reactor in this invention.

FIG. 8 is a cross-section along lines 8—8 of FIG. 7.

FIG. 9 is a cross-section along lines 9—9 of FIG. 7.

Figure 5:
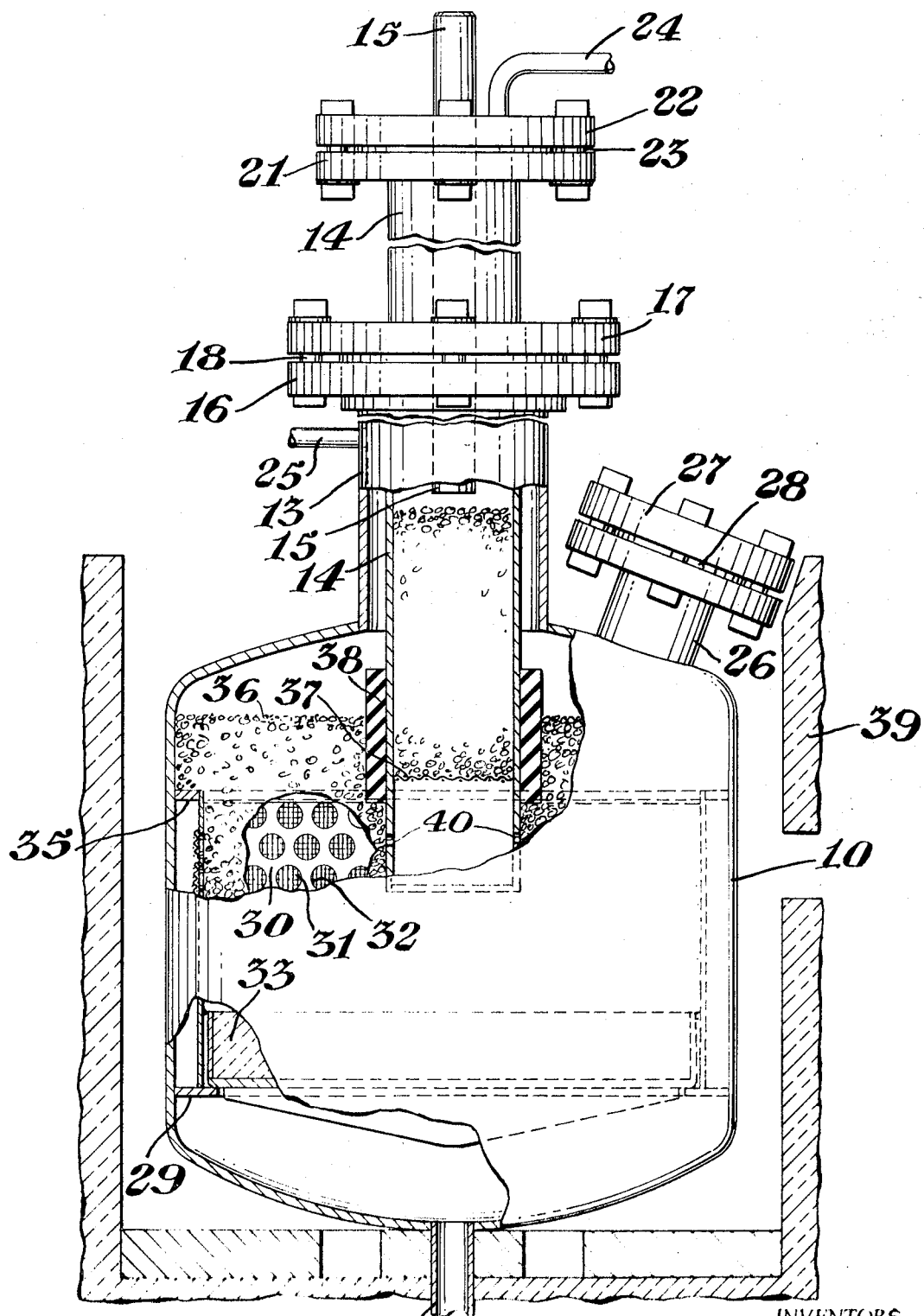
FIG. 5 is an elevation of a modification of the reactor shown in FIG. 1, with parts broken away, to shown the internal structure.

Referring to the drawings, the reactor of FIGS. 1–4, has a cylindrical and vertically extending outer shell 10, on the head of which are disposed a pair of manholes, 11, 12. At the top of the reactor is an elongated tubular section 13 having concentrically situated therein an elongated hollow, cylindrical electric conducting device or electrode 14 and a conduit 15 for feeding a hydrocarbon stream. Attached to tubular section 13, intermediate between a terminal insulated flange 16 and the top of reactor 10 is an electric conducting plate 19 to which a ground cable can be attached. Flange 16 is separated from a mating flange 17 by an electric and heat insulating gasket 18 which can be made of asbestos or other refractory non-conducting substance. Space above flange 17 and connected to electrode 14 at the top of which is attached a conducting plate 20 that is connected to a source of electrical power (not shown). Electrode 14 terminates at its top with a pair of mating flanges 21, 22 having a layer of electric and heat insulating material 23. Flanges 16, 17 and 21, 22 are bolted to each other in and electrically insulated, a vapor tight condition when the reactor is in operation. The bolts holding the flanges are also insulated from the metal surfaces of the flanges. A steam or other inert gas conduit 24 passes through flanges 21, 22 and permits entry of steam into the reactor by channels formed between the walls of conduit 15 and electrode 14. Tubular section 13 may also contain an inlet port 25 for admission of additional steam if needed to prevent back flow of reactants and thereby minimize carbon deposition which could cause short circuits in the reactor. The steam fed through line 25 enters the reaction system through a channel formed between the wall of tubular sectional 13 and the outer wall of electrode 14. At the base of shell 10 is a conduit 25a for removing effluent from the reactor.

The internal structure of the reactor shown in FIGS. 1–4 will be described with the modification shown in FIG. 5 for the reason that internal differences between the reactor of FIG. 1 and FIG. 5 can be described verbally without need for an additional drawing. In FIG. 5 the portion shown centrally above the reactor is identical with FIG. 1 with a section including conducting plates 19, 20 being cut away. In the reactor of FIG. 1 hydrocarbon feed line 15 extends just below the top of the shell of the reactor to the level of the catalys bed whereas in FIG. 5, feed line 15 terminates in a catalyst bed slightly above the reactor shell top. There is a screen extending transversely across tubular electrode 14 to support a small catalyst bed in FIG. 5 but in FIG. 1 the tubular section of the electrode is unobstructed. Also, the reactor in FIG. 5 contains a manhole 26 sealed with mating flange members 27—27 with an insulated gasket 28 in place of manholes 11, 12. The remaining internal structure members of the reactors of FIGS. 1–4 and FIG. 5 are the same.

The reactor 10 has a perforate ledge 29 for supporting a foraminous catalyst holder 30 which has a screen 31 adhered, preferably by welds, around its vertical periphery. The opening 32 in catalyst holder 30 and screen 31 should be of sufficient size to permit ready flow of gases therethrough, but the openings in the screen should be sufficiently fine to prevent catalyst from passing therethrough. The catalyst holder 30 has a snug fitting electrical and heat insulating imperforate base 33 supported by a perforate ledge 29. The base 33 may have one or more support bars 34. The upper portion of the catalyst holder 30 is connected to a peripheral imperforate support ring 35. Above the catalyst bed, if desired, is layer of ceramic or other inert material 36. Electrode 14 has a transverse screen 37 to hold a short bed of catalyst extending from said screen 37 to the base of conduit 15. This small amount of catalyst intermediate the electrode walls acts as a "guard chamber" so that potassium compounds which may be volatized have no effect on the main body of catalyst in the reactor. It is understood that such "guard chamber" need not be part of the electrode. It can be part of a unit separate from the reactor per se, if desired, through which feed vapors are passed into the reactor. Surrounding electrode 15 is an insulating member 38 which rests on a support bar (not shown). For purposes of safety and reduction of heat loss, the entire reactor is placed in a ceramic heat resistant case 39. Electrode 14 which terminates in the catalyst zone, also has a plurality of perforations 40 in the catalyst zone to permit flow of gases into contact with the catalyst.

Figure 6:
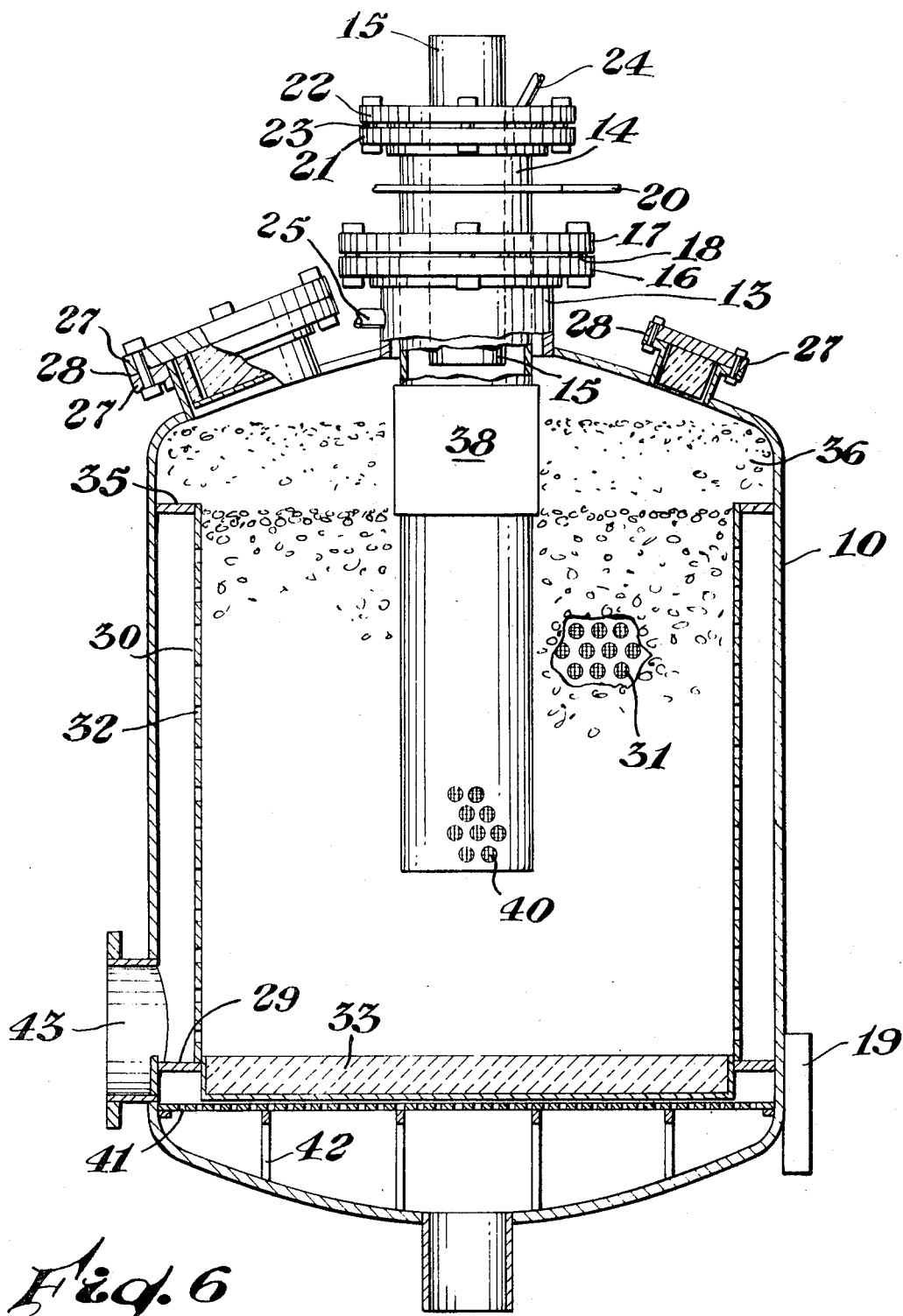
FIG. 6 is a vertical section, with parts broken away, of a modification of the reactor of FIG. 1.

FIG. 6 is a modification of the reactor shown in FIG. 5. Elements bearing repeated numerals are the same as heretofore described. The imperforate base 33 is supported by a transverse framework having a plurality of peripheral openings 41 and a plurality of support legs 42. The reactor also contains a sealable manhole 43 to permit more ready cleaning of the base of the reactor when needed. As shown, the reactor contains two flanged manholes at the top of the shell 10. The top of the catalyst bed is layered with inert ceramic particles such as Berl saddles 36. The conducting plate 19 is located at the base of shell 10.

In each of the reactor modifications described, the best results are obtained if the distance from the bottom of electrode 14 to the imperforate portion 33 is about equal to or greater than the distance between the inner wall of shell 10 and the outer edge of electrode 14.

In operation, electrode 14 will be considered as the anode and reactor wall as the cathode. A vaporized hydrocarbon, preheated to reaction temperature of about 550–650° C. with or without steam, is fed to the reactor through conduit 15. Any additional steam can be fed to the reactor through conduits 24, 25. An electrical current (from a source not shown) is applied to the reactor which had previously been filled with catalyst. The electricity flows from the anode, through the catalyst bed, through the wall of the catalyst holder, through ledge 29 and ring 35 to wall 10 and then to conducting plate or cathode 19. In order to complete the electrical circuit, it is essential that the electricity flows through the catalyst bed in a radial manner to reach cathode 19. The "guard chamber" shown in FIG. 5 protects against development of high resistances in the main catalyst bed adjacent the electrode. It is well known that certain impurities in hydrocarbon streams react with potassium compounds in the catalyst to convert such compounds to salts which are volatile at the reaction temperature used for dehydrogenating ethyl benzene to styrene. It is believed, but not necessarily a fact, that the loss of potassium compounds from the catalyst results in high resistivities. When the loss of potassium oxide is confined to that portion of the catalyst found in the "guard chamber" the remainder of the catalyst in the reactor will retain its normal resistivity, so that a more uniform catalytic activity can be maintained over long periods of time. The hydrocarbon and steam mixture pass through the catalyst in a radial manner to the space defined by wall of shell 10 and the catalyst holding screen 31. Then, the reacted gas passed through perforate ledge 29 and out of the reactor through conduit 25a. The subsequent cooling and purification trains are well known to the art and are not part of this invention.

The previous reactors employed the radial process flow-radial current flow principle. The reactor shown in FIGS. 7–9 employs the principle of axial process flow-radial current flow.

The reactor at its top has an elongated tubular section, a concentrically spaced electrical conductor, a hydrocarbon feeding conduit, a stream feeding conduit and the insulated flanged connections shown in FIG. 1 and these are not repeated in FIG. 7 for the purpose of brevity. Electrode 14 in FIG. 7 terminates at its base with plurality of openings 44 through which the reactants such as steam and a hydrocarbon are fed into contact with catalyst which is placed in catalyst chamber 45. Connected to electrode 14 is a hollow conducting drum imperforate on the top and having an opening 47 at its base for pressure equalization during heating and cooling. It has a ledge 48 which supports a catalyst retaining screen 49 which can be spot welded to the ledge. The screen has a plurality of stiffening ribs 50 welded to the ledge 48. The base of drum 46 must be spaced from the screen 49 a distance equal to that between the outer wall of the drum and the inner wall of shell 10 in order to assure radial current flow through the catalyst bed. At the top of the reactor is electrode or ground 51 which can serve as a cathode. Sealable openings 52, 53 can be employed for filling the reactor with catalyst and for removing spent catalyst.

Alternatively, openings 52, 53 can be fitted with valves for use as auxiliary sources of steam, if necessary. In operation, a mixture of hydrocarbon and steam is passed to the catalyst in bed 45 through the hollow electrode 14, and a supplemental stream of steam can be passed to the reactor through the channel defined by the outer wall of electrode 14 and inner wall of conduit 15. The reaction mixture passes axially through the catalyst bed and exits through conduit 25a. The electrical current, if element 51 is the cathode, passes to the catalyst through electrode 14 and then radially through the catalyst to the wall of shell 10 through cathode 51 back to the source of current to complete the circuit.

The material of construction of the reactor can be any heat resistant, electrical conducting material such as schedule 40 steel, the 400 series stainless steels or other stainless steel known to be useful for reactors for dehydrogenating hydrocarbon.

The catalyst which is to be employed will depend largely on the type of hydrocarbon to be hydrogenated. Thus, if ethyl benzene, isopropyl benzene, or ring substituted derivatives thereof to be converted to the corresponding styrene or isopropyl benzene by dehydrogenation of the ethyl or isopropyl group without affecting the rest of the molecule, the catalyst can be self-regenerating containing MgO, ZnO, $Fe_2O_3$, $Cr_2O_3$ and $K_2CO_3$. Catalysts of this type are disclosed in U.S. Pats. 3,288,871 and 3,435,086. For dehydrogenating alkenes to alkadienes there are many well-known catalysts.

The catalyst resistivity for a radial electrical flow reactor is desirably between 50 and 500 ohm-cm. For such a reactor with radial electrical flow the electrical resistance of the catalyst is given by the formula $$R = \frac{P}{2L} \ln \frac{OD}{ID}$$

where P is the resistivity of the catalyst, L is the length of the bed and $$\ln = \frac{OD}{ID}$$

is the natural logarithm of the ratio of the outer and inner electrode diameters. The electrical current can be A.C. or D.C. but the latter is preferable because it can be provided from a comparatively steady voltage and variable amperage source. With D.C. current, a steadier resistivity state can be maintained over long periods of time.

Example 1

The reactor shown in FIG. 5 made of 430 stainless steel was filled to a point above the perforated section of the central electrode with a catalyst containing about 85% $Fe_2O_3$, 12.5% $K_2CO_3$, and 2.5% $Cr_2O_3$—the guard chamber in the hollow electrode was also filled with the same catalyst. A mixture of water and ethyl benzene was preheated to about reaction temperature and fed into the reactor through the hollow electrode. An auxiliary steam stream was fed into the annular through opening 25 to prevent back flow of ingredients and to minimize the possibility of carbon deposition on the electrode or wall surfaces which would result in short circuiting the flow of electric current. The reactor contained a ceramic false bottom to prevent the flow of current directly to the bottom of the reactor shell. The central electrode was connected to one side of an electrical D.C. generator and the other side of the generator was connected to the shell of the reactor.

Data taken during 199 hours of operation are tabulated below.

| Temp., ° C. | | Feed rate, pounds/hr. | | Watts | Percent conv. styrene | Percent yield styrene | Resistivity, ohm inches |
| --- | --- | --- | --- | --- | --- | --- | --- |
| Reactor inlet | Reactor outlet | E.B. | H₂O | | | | |
| 573 | 496 | 29.4 | 50.0 | 1,369 | 38.19 | 90.85 | 4.3 |
| 568 | 494 | 26.6 | 50.0 | 1,398 | 37.63 | 91.09 | 4.3 |
| 570 | 495 | 25.2 | 50.0 | 1,363 | 38.22 | 90.93 | 4.0 |
| 569 | 495 | 25.2 | 50.0 | 1,296 | 37.14 | 91.05 | 3.9 |
| 572 | 494 | 25.2 | 50.0 | 1,251 | 37.08 | 90.83 | 3.6 |
| 580 | 494 | 23.1 | 50.0 | 1,197 | 38.90 | 90.48 | 3.4 |
| 583 | 496 | 25.2 | 50.0 | 1,183 | 38.69 | 90.48 | 3.3 |
| 548 | 493 | 25.2 | 50.0 | 1,311 | 34.58 | 91.53 | 4.3 |

E.B.=Ethylbenzene.

The voltage in the tests varied from 9.5 to 11.8 while amperage ranged from 114 to 132. The above data were taken in a radial process flow-radial current flow reactor.

Example 2

In these tests the reactor described in FIGS. 7–9 was employed to show a run in an axial process flow radial current flow system. The reactor was made of 430 stainless steel. The catalyst used was the same type as that described in the above example. The central electrode was connected to one side of a D.C. generator and the other side was connected to the shell of the reactor. As in the previous examples, a mixture of ethyl benzene and water was heated to reactor temperature and fed to the reactor through the hollow central electrode.

The data obtained in 756 hours of continuous operation are tabulated below.

| Temp., ° C. | | Feed rate, pounds/hr. | | Watts | Percent conv. styrene | Percent yield styrene | Resistivity, ohm inches |
| --- | --- | --- | --- | --- | --- | --- | --- |
| Reactor inlet | Reactor outlet | E.B. | H₂O | | | | |
| 585 | 534 | 25.0 | 25.0 | 805 | 25.32 | 92.76 | 4.2 |
| 589 | 534 | 25.0 | 25.0 | 799 | 25.32 | 93.03 | 4.1 |
| 593 | 555 | 27.3 | 25.0 | 1,620 | 33.57 | 91.55 | 3.2 |
| 600 | 556 | 27.3 | 25.0 | 1,555 | 36.33 | 91.58 | 2.9 |
| 603 | 558 | 25.0 | 25.0 | 1,500 | 36.93 | 91.45 | 2.7 |
| 617 | 562 | 25.2 | 25.0 | 1,470 | 39.19 | 91.28 | 2.6 |
| 618 | 562 | 23.1 | 25.0 | 1,450 | 39.18 | 91.24 | 2.5 |
| 607 | 558 | 31.5 | 25.0 | 1,565 | 38.74 | 91.06 | 2.6 |
| 611 | 557 | 29.4 | 25.0 | 1,552 | 39.54 | 92.34 | 2.5 |
| 602 | 557 | 23.1 | 25.0 | 1,525 | 38.96 | 91.69 | 2.5 |
| 608 | 556 | 23.1 | 25.0 | 1,496 | 39.28 | 92.58 | 2.4 |
| 607 | 558 | 25.2 | 25.0 | 1,487 | 39.23 | 92.39 | 2.3 |
| 608 | 558 | 25.2 | 25.0 | 1,474 | 39.23 | 92.64 | 2.3 |
| 608 | 556 | 27.3 | 25.0 | 1,414 | 38.47 | 92.55 | 2.3 |
| 611 | 562 | 25.2 | 25.0 | 1,493 | 39.73 | 92.51 | 2.1 |
| 611 | 561 | 25.0 | 25.0 | 1,473 | 38.96 | 93.28 | 2.1 |
| 610 | 563 | 25.2 | 25.0 | 1,509 | 38.97 | 92.92 | 2.0 |
| 594 | 546 | 25.2 | 25.0 | 1,509 | 38.77 | 91.74 | 2.5 |
| 596 | 551 | 25.2 | 25.0 | 1,651 | 39.56 | 91.87 | 2.4 |
| 594 | 552 | 27.3 | 25.0 | 1,578 | 39.76 | 92.38 | 2.4 |
| 593 | 552 | 25.0 | 25.0 | 1,625 | 38.99 | 92.86 | 2.3 |
| 595 | 550 | 25.2 | 25.0 | 1,594 | 39.76 | 91.93 | 2.5 |
| 594 | 551 | 27.3 | 25.0 | 1,622 | 39.26 | 92.12 | 2.5 |
| 597 | 553 | 27.3 | 25.0 | 1,677 | 39.76 | 92.51 | 2.4 |
| 595 | 553 | 25.0 | 25.0 | 1,626 | 39.60 | 93.00 | 2.4 |
| 595 | 554 | 27.3 | 25.0 | 1,595 | 39.61 | 93.11 | 2.3 |
| 592 | 511 | 29.4 | 30.0 | 220 | 21.11 | 93.81 | 1.4 |
| 594 | 560 | 31.5 | 30.0 | 1,938 | 39.29 | 92.67 | 2.2 |
| 593 | 565 | 33.6 | 35.0 | 2,358 | 39.75 | 92.59 | 2.1 |
| 594 | 566 | 33.6 | 35.0 | 2,363 | 39.31 | 93.17 | 2.1 |
| 591 | 567 | 33.6 | 35.0 | 2,349 | 39.97 | 93.34 | 2.0 |

The data show that it is possible to operate at extremely high throughput rates. Space velocities of about 75 pounds of hydrocarbon per hour per cubic foot of catalyst were achieved, as compared with conventional production units of about 30 pounds of hydrocarbon per pound of catalyst per hour.

The voltage at the reactor terminals ranged from 7.05 to 11.14 and the amperage ranged from 109.5 to 217 during the above runs.

Although we have disclosed the invention by specific examples of dehydrogenation of ethyl benzene to styrene, this same principle of maintaining the desired catalyst temperature by passing an electrical current therethrough is applicable to all forms of catalytic dehydrogenation of hydrocarbons, particularly to the dehydrogenation of alkyl benzenes having at least one alkyl group containing at least 2C atoms and to the dehydrogenation of aliphatic hydrocarbons having at least 2C atoms. The reactors are specially useful for the dehydrogenation of monoolefins having a total of from 4 to 8C atoms and at least 4C atoms in a chain to the corresponding dienes.

We claim:

1. A reactor for effecting catalytic dehydrogenation of hydrocarbons comprising, a heat resistant electrically conducting shell, a catalyst chamber within said shell a conduit for feeding reactant at one end of said reactor for contact with a solid catalyst, a conduit for removing reactant effluent from the other end of said reactor and electrical circuit means for passing an electrical current through said solid catalyst, one electrode of said circuit being situated internally of said reactor, said internally situated electrode being hollow and having an opening in the catalyst zone for permitting passage of reactants into contact with said solid catalyst said internally situated electrode terminating in a bed of said solid catalyst and a second electrode having contact with the shell of said reactor, such that the electrical circuit is made by radial passage of electrical current from one electrode through the bed of solid catalyst to the second electrode.

2. The reactor of claim 1 in which the internally situated electrode is spaced equidistant from the reactor shell.

3. A reactor as in claim 1 having insulating means at the effluent end to prevent electrical current from passage directly to the wall of said reactor without passage through the said catalyst.

4. A reactor of claim 1 in which the reactants and electrical current pass radially through the catalyst.

5. A reactor of claim 1 in which reactants pass axially through the catalyst and electrical current passes through the catalyst in a radial manner.

6. A reactor of claim 1 in which the electrode in contact with the catalyst is hollow and is centrally located relative to said catalyst bed and is perforated at the point where the electrode contacts the catalyst, to permit passage of reactants through said electrode and into contact with said catalyst.

7. A reactor of claim 5 in which the electrode which is in contact with the catalyst is spaced substantially equidistant from the wall of reactor shell.

8. A reactor of claim 1 in which the catalyst chamber has a foraminous outer wall to permit passage of reactants therethrough, to retain the catalyst in a confined space and an imperforate electrical and heat insulating base.

9. A reactor of claim 1 in which the electrode in contact with the catalyst is hollow and having a space near the inlet end of the reactor for a small amount of catalyst separate from the main catalyst chamber, said electrode also having a plurality of openings in the area of contact with the catalyst for permitting passage of reactants which are fed through said hollow electrode into communication with said catalyst.

10. A reactor of claim 1 which is cylindrical in form.

11. A method of dehydrogenating alkyl benzenes having at least one alkyl group containing 2–3 C atoms at a temperature of 500–750° C. comprising passing a mixture of steam or other inert gas and at least one of said alkyl benzenes through a hollow electrode into contact with a regenerative catalyst bed and maintaining the desired temperature in a reactor by passing an electrical current through one electrode which is essentially centrally located and terminates in said bed and another electrode which is the wall of the reactor to effect radial flow of electrical current through said catalyst bed.

12. The method of claim 11 in which the flow of electrical current and reactants are both radial.

13. The method of claim 11 in which the flow of electrical current is radial and the flow of reactants is axial.

14. The method of claim 11 in which the alkyl benzene is ethyl benzene and the product produced is styrene.

15. The method of claim 11 in which the alkyl benzene is ethyl toluene and the product produced is vinyl toluene.

16. The method of claim 11 in which the alkyl benzene is diethyl benzene and the product produced is a mixture of divinyl benzene and ethyl styrene.

References Cited

UNITED STATES PATENTS

| | | | |
|---|---|---|---|
| 2,485,276 | 10/1949 | Gerbes | 23—288 J |
| 3,288,871 | 11/1966 | Soderquist et al. | 260—669 |
| 3,435,086 | 3/1969 | Soderquist et al. | 260—669 |

CURTIS R. DAVIS, Primary Examiner

U.S. Cl. X.R.

23—288 J